United States Patent Office 3,183,706
Patented May 18, 1965

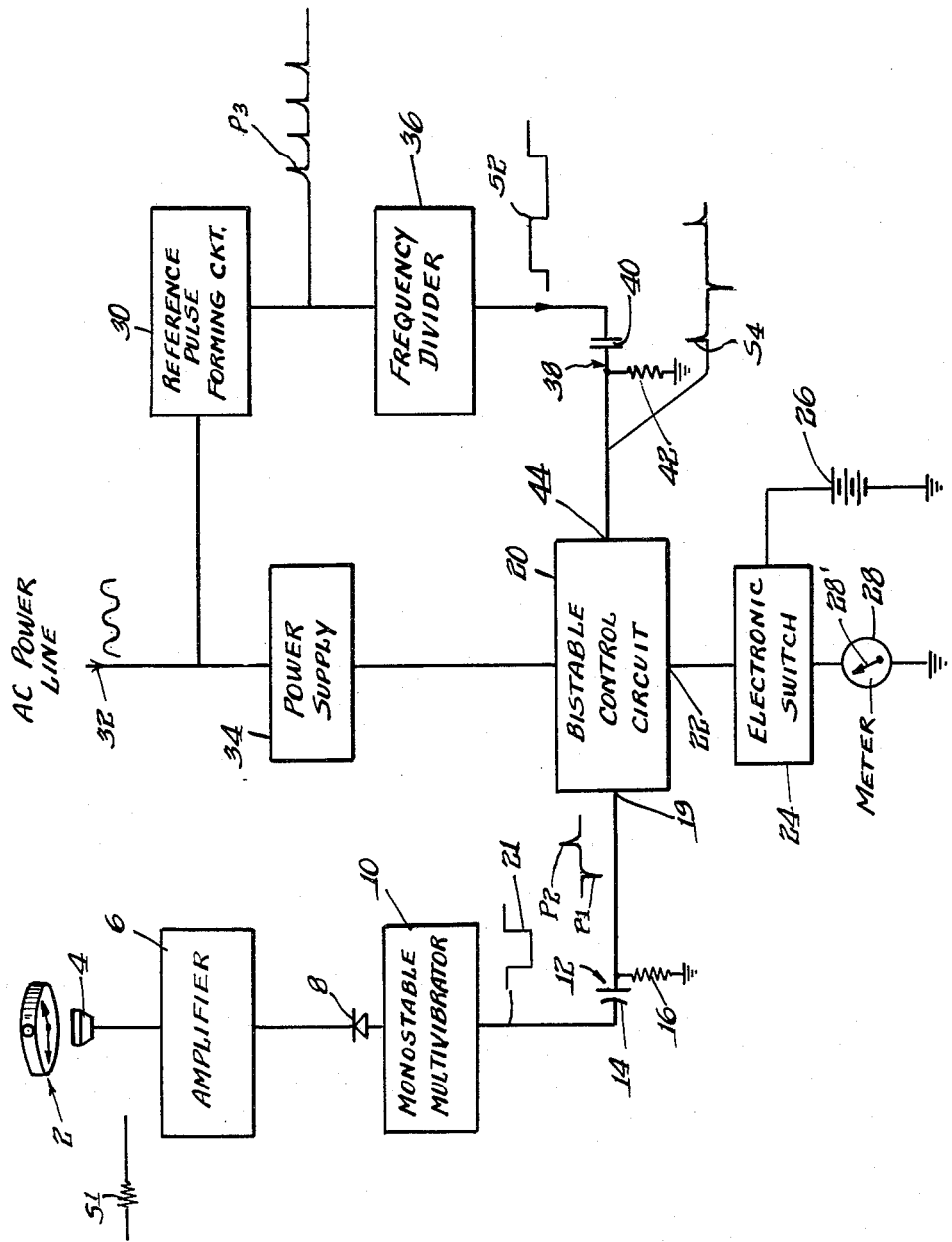

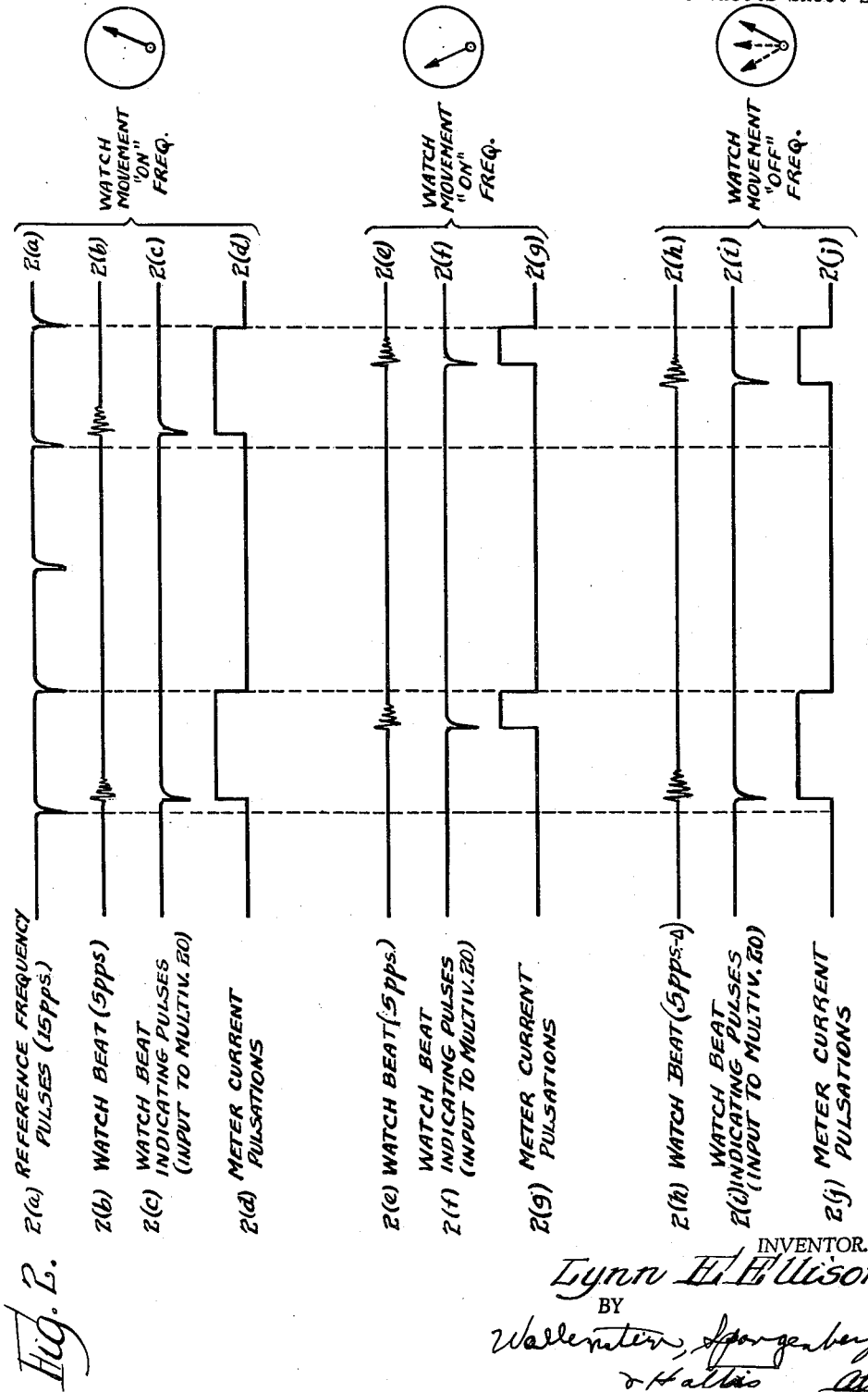

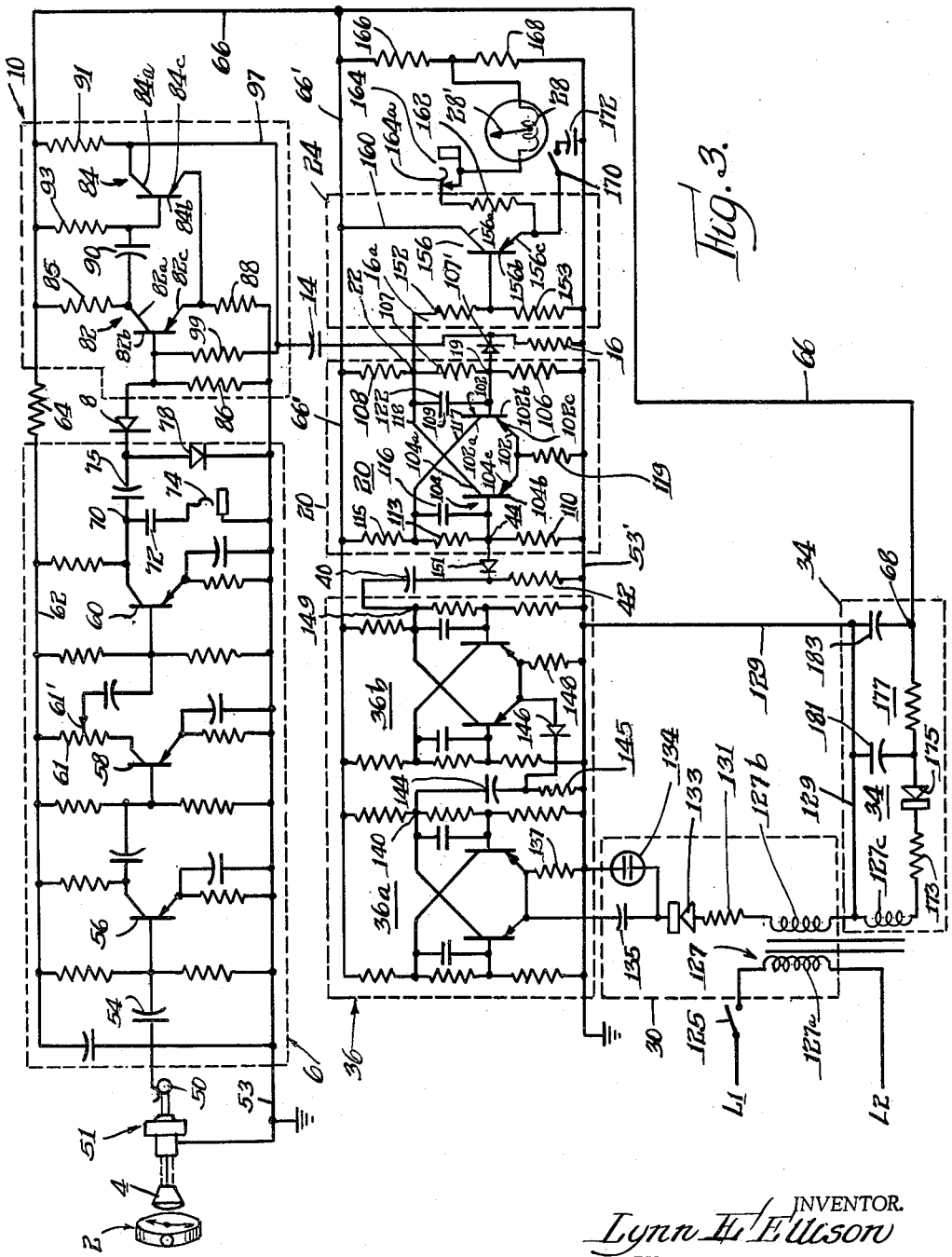

3,183,706
WATCH TESTING APPARATUS
Lynn E. Ellison, 476 Golf Road, Crystal Lake, Ill.
Filed Mar. 23, 1962, Ser. No. 181,885
4 Claims. (Cl. 73—6)

This invention relates to apparatus for comparing the beat or oscillation frequency of a watch movement with a reference frequency.

Watch testing apparatuses of the type which compares the oscillation frequency of a watch movement with a predetermined reference frequency may take numerous forms. One form of such apparatus indicates the "on" and "off" frequency conditions of the watch movement under test by the deflection of the pointer on the current indicating scale of a direct current (D.C.) meter movement. When the oscillation frequency of the watch movement corresponds to the reference frequency, the deflection of the pointer on the face of the meter is constant, and when such relationship is not present, the deflection of the pointer continuously and progressively varies over substantially the entire extent of the scale.

U.S. Patent No. 2,541,286 discloses a watch testing apparatus of the type just described for testing and adjusting the watch balance before it is inserted into a watch movement. A circuit is therein disclosed for controlling the flow of current through the meter movement which circuit utilizes a pair of series connected switches which are respectively mechanically opened and closed by the watch balance and a standard balance in accordance with the oscillation frequencies thereof. There, each of the switches comprises the blade of the hair spring engaging and disengaging a pair of electrically insulated pins which are identical to the curb pins in a watch movement. The standard balance oscillates at the same frequency as the desired oscillation frequency of the watch balance under test. When both switches are simultaneously closed, a D.C. voltage source is connected to the meter movement. When the oscillation frequency of the standard balance corresponds to the oscillation frequency of the watch balance under test, the relative phase of the instants of opening and closing of the series connected switches will remain constant, and current pulses of constant duration pass through the meter movement. The resulting constant deflection of the meter pointer indicates that the watch balance under test is "on" frequency. However, if that relationship does not exist between the oscillation frequencies of the standard balance and the watch balance under test, the relative phase of the instants of the opening and closing of the series connected switches will progressively vary. The resulting progressively varying deflection of the meter pointer indicates that the watch balance under test is "off" frequency. The hair spring of the watch balance is adjusted to the proper length to cause the oscillation frequency of the watch balance to correspond to that of the standard balance, the hair spring is marked and severed at that length, and then the adjusted watch balance is inserted in the watch movement.

It is an object of the present invention to provide improved test apparatus which indicates the "on" and "off" frequency conditions of the balance of a watch movement in the general manner above described, and wherein no physical or direct electrical connections are required between the test apparatus and the watch movement under test or its balance. To this end, the present invention utilizes a microphone which responds to the audible ticking of the watch or its movement, enabling the test apparatus to be easily and conveniently used by even non-skilled persons. A related object of the invention is to provide a watch testing apparatus as just described which does not require a standard watch movement or balance.

To this end, the present invention utilizes the commercial alternating current (A.C.) power line voltage as the source of the reference frequency, such voltage being generally kept by the power companies precisely "on" frequency, so that the user of the test apparatus need not be concerned about the accuracy of a standard watch movement incorporated in the test apparatus as heretofore used.

The electrical signal generated by a microphone responding to the beat of a watch movement will comprise a series of spaced signal units representing the various beats of the watch. Each of these signal units comprises contiguous pulsations representing the vibration of one beat of the watch movement. In the most advantageous form of the invention, electrical signals derived from the output of the microphone are utilized to control the conductive state of an electronic switch controlling the coupling of a current source to the meter movement referred to above. The control of the electronic switch is preferably effected through a bistable circuit which is triggered into one state of operation at the beginning of each signal unit of the microphone output. The electronic switch is rendered conductive during this state of the bistable circuit. The bistable circuit is triggered into its opposite state to render the electronic switch non-conductive upon the occurrence of a reference timing pulse derived from the A.C. power line voltage previously referred to.

The proper operation of a timing circuit of the type described above depends in part upon the nature of the signals utilized to trigger the bistable circuit and the relative frequencies or phases of the reference frequency and the narrow range of watch oscillation frequencies expected with the watch movements to be tested. Difficulties can occur, for example, if the duration of the beats of the watch movement overlap two cycles of the reference frequency. Also, the multiple pulses making up each signal unit at the output of the microphone can in some instances cause false multiple triggering of a bistable control circuit to which the signals are fed.

It is, therefore, another object of the invention to so design the test apparatus that the difficulties referred to above are not present.

To this end, in accordance with another aspect of the present invention, the reference frequency derived from the A.-C. power line voltage is obtained by means including a pulse forming circuit which produces relatively narrow pulses from the rather wide sinusoidal power line voltage waveform. These narrow pulses are fed through a pulse divider circuit to reduce the frequency of the pulses to a frequency which is most advantageously 3, 4 or 5 times that of the desired beat frequency of the watch movements to be tested, which are generally five beats per second. As above indicated, in the most advantageous form of the invention the reference pulses are utilized to trigger a bistable circuit to a state which renders the electronic switch feeding the meter movement to its non-conductive condition.

In accordance with another aspect of the invention, the output of the microphone which picks up the beats of the watch movement are fed to a pulse shaping circuit which effectively generates a single narrow pulse coinciding with the start of each beat indicating signal unit at the output of the microphone. The subsequent pulsations of each signal unit are eliminated from the input to the bistable circuit. The pulse shaping circuit most advantageously is a monostable multivibrator which provides a square pulse having a duration greater than the longest duration of a beat pulsation expected from the watch movements to be tested. The square wave output of the monostable multivibrator is fed through a differentiating and rectifying network which provides a pulse coincident with the leading edge of the square wave output of the monostable multivibrator.

These and other objects, features and advantages of the invention will be apparent upon making reference to the specification to follow, the claims and the drawings wherein:

FIG. 1 is a simplified box diagram of an electrical circuit illustrating the watch testing equipment of the present invention;

FIGS. 2a through 2j are timing diagrams of some of the current and voltage waveforms in the circuit of FIG 1 for different conditions of the watch under test; and FIG. 3 is a detailed circuit diagram of the circuit shown in box form in FIG. 1.

Referring now to FIG. 1, the watch under test, which is generally indicated by reference numeral 2, is clamped in place or otherwise held adjacent to a conventional microphone 4 which generates electrical signals corresponding to the vibrations of each beat or tick of the watch movement 2. The electrical output of the microphone representing the vibrations of a single beat of the watch is indicated by waveform S1 in FIG. 1. This waveform comprises contiguous alternating pulsations which cease at the end of each beat or tick of the watch. This beat indicating waveform reoccurs at the beat frequency of about five beats per second in most watches.

The electrical output of the microphone 4 is fed to an amplifier 6 which produces an amplified signal corresponding to the waveform S1 but of much greater magnitude. The amplifier output is fed through a rectifier 8 which provides pulsations of only a single polarity. The output of the rectifier 8 is fed to one of the control inputs of a monostable or "one shot" multivibrator 10 which is thereby triggered from a stable reset or reference state to an unstable state by the first of the pulsations of each beat indicating signal received from the amplifier 6. The multivibrator 10 remains in its unstable state for a fixed predetermined period, depending upon the time constant of the circuit involved, such time period being purposefully designed to be greater than the longest duration beat indicating signal expected from the watch movements to be tested. The monostable multivibrator then returns to and stays in its reset or reference state until it receives the next beat indicating signal from the amplifier 6. The output of the monostable multivibrator circuit 10 has a square waveform 21 as shown in FIG. 1 with relatively steep leading and trailing edges.

The output of the monostable multivibrator 10 is connected to a differentiating network 12 which comprises a capacitor 14 in series with a resistor 16. As is conventional in differentiating networks, the time constant thereof is made sufficiently short that the voltage appearing across the resistor 16 when a square wave is fed to the input of the network comprises voltage spikes or pulses P1 and P2 of opposite polarity coinciding respectively with the leading and trailing edges of the square wave 21. The negative pulse P1 coinciding with the leading edge of each square wave is fed to the input 19 of a bistable or flip-flop circuit 20 where it triggers the same from a reset state of operation to an opposite state of operation. To avoid any possible operation of the bistable multivibrator circuit 20 by a positive pulse (not shown in FIG. 1), a rectifier may be inserted in the line to the multivibrator circuit 20 or the multivibrator circuit can be designed to be non-responsive to such positive pulses. When the bistable circuit 20 is in the latter state, an output voltage appears at an output terminal 22 which is coupled to an electronic switch 24 where it renders the same conductive. Direct current (D.C.) from the source of direct current voltage 26 is then fed to a D.C. meter 28. The electronic switch 24 remains in a conductive state until the bistable circuit 20 is reset.

A circuit for supplying reference frequency pulses for resetting the bistable circuit 20 is provided including a pulse forming circuit 30 whose input is connected to an alternating current (A.C.) power system 32 which in the United States generally has a frequency of sixty cycles per second. The power system 32 also may be fed to the input of a suitable D.C. power supply source 34 which supplies D.C. energizing potential to the bistable control circuit 20 as well as other parts of the circuit.

The pulse forming circuit 30 generates one narrow pulsation P3 of a given polarity for each cycle of the A.C. voltage fed to the input of the pulse forming circuit 30. The output of the pulse forming circuit 30 is connected to a frequency divider 36 which provides a square wave output S2 at a frequency which bears an integral numerical relation to the desired watch beat frequency (five beats per second) and which is more comparable to the watch beat frequency than sixty pulses (or cycles) per second. Thus, the frequency divider 36 may produce a waveform at a frequency of fifteen cycles per second. This waveform is fed to a differentiating network 38 comprising a capacitor 40 and a resistor 42. The pulses developed across resistor 42 are fed to the input 44 of the bistable circuit 20 to reset the same.

The manner in which the circuit shown in FIG. 1 operates to indicate the "on" and "off" frequency conditions of the watch under test is best understood by an explanation of various waveforms in the circuit as shown in FIGS. 2(a) through 2(j).

The various waveforms shown in FIGS. 2(a) through 2(j) are drawn on a common time scale and illustrate the operation of the circuit shown in FIG. 1 for three different conditions of the watch 2. FIG. 2(a) illustrates the reference frequency pulses (fifteen pulses per second) fed to the input 44 of bistable circuit 20. FIGS. 2(b) through 2(d) illustrate various waveforms controlled by the beat of the watch where the latter is "on" frequency, namely a frequency of five beats per second. FIGS. 2(e) through 2(g) are waveforms corresponding to FIGS. 2(b) through 2(d) for an "on" frequency condition where the phase of the watch beats is different from FIG. 2(b), and FIGS. 2(h) through 2(j) represent the corresponding waveforms for an "off" frequency condition.

Refer first to the "on" frequency condition illustrated in FIGS. 2(b) through 2(d). FIG. 2(b) shows the five pulses per second watch beat indicating signals at the output of the amplifier 6. As there shown, each beat comprises a number of contiguous vibrations or pulsations. FIG. 2(c) shows the pulses fed to the input 19 of the bistable circuit 20 coincident with the beginning of the beat indicating signals of FIG. 2(b). FIG. 2(d) shows the periods of conduction of the electronic switch 24, which are initiated by the beat indicating pulses of FIG. 2(c) and terminated by the next occurring reference pulses of FIG. 2(a). Since the reference pulse frequency of fifteen pulses per second bears an integral numerical relationship with respect to the beat frequency of the watch 2, the relative phase between the beat indicating pulses of FIG. 2(c) and the reference pulses of FIG. 2(a) will remain constant, so that the conduction intervals of the electronic switch 24 will remain constant. The pointer 28' of the meter 28 will then have a substantially constant deflection. The meter movement is fairly heavily damped so that the pointer 28' will remain fairly stationary with only a small noticeable oscillation.

FIG. 2(e) illustrates the amplified watch beat indicating signals occurring at five signals per second where the watch beats have a later phase relationship with respect to the reference frequency pulses shown in FIG. 2(b) and thus the conduction intervals of the electronic switch 24 are decreased accordingly. The deflection of the pointer 28' of the meter 28 will be less than that present under the condition of FIGS. 2(b) through 2(d), but the deflection will remain substantially constant, indicating the "on" frequency condition of the watch 2.

FIG. 2(h) illustrates the amplified beat indicating signals for a situation where the watch is "off" frequency. Under these circumstances, it is apparent that the relative phase between the beat indicating signals and the reference frequency pulses of FIG. 2(a) will vary with time. Accordingly, the duration of the conduction intervals of the electronic switch 24 for successive watch beat pulsations will vary as indicated, so that the deflection of the pointer 28' will vary progressively with time.

Refer now to the circuit diagram of FIG. 3 which illustrates a preferred circuit for the form of the invention shown in box form in FIG. 1. Corresponding elements in FIGS. 1 and 3 have been indicated by similar reference numerals. As shown in FIG. 3, the microphone 4 is connected to a plug 50 which is insertable into a conventional jack 51. When inserted in the jack, the microphone 4 is connected between a ground line 53 and the input side of a capacitor 54 connected to the first stage of a three stage amplifier 6. The amplifier 6 is preferably a conventional type transistorized amplifier including three PNP transistors 56, 58 and 60. The transistor 58 has associated therewith a potentiometer 61 having a movable wiper 61' which varies the amplitude of the output obtained from the amplifier stage involved.

The various transistors are energized through a common line 62 connected through a voltage dropping resistor 64 and a line 66 to the negative terminal 68 of the direct current power supply 34. The output of the third stage of the amplifier 6 is taken at an output terminal 70 to which is connected a branch circuit including a capacitor 72 and a normally-open jack 74 into which ear phones or a speaker may be plugged so that the ticking of the watch can be heard if desired.

Another output branch circuit extends from the output terminal 70 through a capacitor 75 to the anode of a rectifier 78 whose cathode is connected to the ground line 53. The rectifier 78 acts as a clamping device which clamps the varying output of the rectifier to ground, thereby giving a voltage doubling effect. The resulting negative going voltage is fed through the previously described rectifier 8 to the input of the monostable multivibrator 10.

The monostable multivibrator 10 may be a conventional transistor "one shot" multivibrator including two transistors 82 and 84 of the PNP type. The collector electrode 82a of the transistor 82 is connected through a resistor 85 to the negative line 66. The base electrode 82b of the transistor 82 is connected to the output side of the rectifier 8. A resistor 86 is connected between the base electrode 82b and the ground line 53. A resistor 88 is connected between the emitter electrode 82c of the transistor 82 and the ground line 53. A capacitor 90 is connected between the collector electrode 82a of the transistor 82 and the base electrode 84b of the transistor 84.

The collector electrode 84a of the transistor 84 is connected through a resistor 91 to the negative line 66. The emitter electrode 84c of the transistor 84 is connected to the ungrounded side of the resistor 88. The transistor 84 is initially biased into a highly conducted stable state by the connection of the base electrode 84b of transistor 84 through a resistor 93 to the negative line 66. The resulting negative voltage on the base electrode 84b will render the transistor 84 normally highly conductive. The resulting voltage developed across the resistor 88 used in common with the emitter circuit of the transistors 82 and 84 will bias the transistor 82 to a non-conductive condition.

The first negative pulse of a beat indicating vibration appearing at the base electrode 82b of the transistor 82 will initiate conduction of the transistor 82. This will result in a sudden change of the voltage at the collector electrode 82a from a highly negative value to near ground or zero voltage, and a relatively positive voltage is coupled through the capacitor 90 to the base electrode 84b of the transistor 84 to render the same relatively non-conductive. This will cause the voltage on the collector electrode 84a thereof to become more negative. The resulting negative voltage is coupled through a feedback line 97 and a resistor 99 to the base electrode 82b of the transistor 82. The feedback circuit rapidly causes the transistor 82 to become highly conductive and the transistor 84 to become non-conductive. This condition remains until the capacitor 90 substantially fully charged to the new voltage conditions of the circuit, whereupon the connection of the base electrode 84b through the resistor 93 to the negative line 66 once more becomes effective to render the transistor 84 non-conductive.

The voltage waveform on the feedback line 97 constitutes the output of the multivibrator and comprises a single square wave for each beat indicating signal fed to the input of the monostable multivibrator circuit 10.

As previously indicated, the period during which the monostable multivibrator circuit 10 is in its unstable state is longer than the longest expected duration of each watch beat vibration, so that subsequent pulses of each beat indicating signal will have no effect on the multivibrator circuit 10.

The square wave output of the multivibrator circuit 10 is fed to a differentiating network including capacitor 14 and resistor 16. A sharp negative and a sharp positive pulsation will appear across the resistor 16 coinciding respectively with the leading and trailing edges of each square wave output of the multivibrator 10. Only the negative pulse should be effective to trigger the bistable circuit 20 and, unless the multivibrator circuit is made non-responsive to the positive pulse developed across the resistor 16 by proper bias conditions, a rectifier 107' is provided to remove the positive pulses from the input to the bistable circuit 20.

The output of the rectifier 107' is connected to the base electrode 102b of a PNP type transistor 102 forming part of the bistable circuit 20. This bistable circuit 20 has two stable states rather than one as in the case of the monostable multivibrator circuit 10. The bistable circuit 20 has another PNP type transistor 104. The base electrode 102b is connected to one end of a resistor 106 whose opposite end is connected to the ground line 53'. The resistor 106 is connected to the negative line 66' through series connected resistors 107 and 108. A capacitor 109 is coupled in parallel with the resistor 107. A base electrode 104b of the transistor 104 is connected to one end of the resistor 110 whose opposite end is connected to the ground line 53'. The resistor 110 is connected to the negative line 66' through series-connected resistors 113 and 115. The collector electrode 102a of the transistor 102 is connected by a conductor 117 to the juncture between resistors 113 and 115. The collector electrode 104a of the transistor 104 is connected by a conductor 118 to the juncture between resistors 107 and 108. The emitter electrodes 102b and 104b of the transistors 102 and 104 are connected through a common resistor 119 to the ground line 53'. As is common in bistable transistor circuits of this type, when one of the transistors is highly conductive, the resulting bias conditions on the base electrode of the other transistor will render the latter transistor non-conductive. The conductive and non-conductive conditions of the two transistors are reversed whenever a negative pulse is fed to the base electrode of a non-conductive transistor.

As previously indicated, the bistable circuit 20 is normally in a reset condition effected by the feeding of a reference frequency pulse to the input 44 of the bistable circuit 20. The bistable circuit is triggered into the opposite state by a negative beat indicating pulse fed to the input 19 of the bistable control circuit.

The reference frequency pulses are derived from the alternating current voltage of a commercial power system. In FIG. 3, lines L1 and L2 represent the two input conductors from the power system. An on-off switch 125 is connected between one of the power lines L1 and one end of the primary winding 127a of a transformer 127. The other end of the primary winding 127a is connected to the power line L2. The transformer 127 has two secondary windings 127b and 127c. One end of the secondary winding 127b is connected by line 129 to the ground line 53'. The other end of the secondary winding 127b is connected by a resistor 131 and a rectifier 133 to a neon tube 134 connected to the ground line 53'. The rectifier 133 is also coupled to the ground line 53' through a capacitor 135 in series with a resistor 137. The various elements just described including the neon tube 134 form the aforementioned pulse forming circuit 30. The rectifier 133 removes the negative going portions of the alternating current voltage from the power lines L1 and L2 present in the secondary winding 127b, and passes the positive going portions thereof to the capacitor 135. When the charge on the capacitor 135 reaches the firing potential of the neon tube 134, the neon tube 134 fires and the bottom end of the capacitor 135 is effectively grounded, which effects discharge of the capacitor through the resistor 137 producing a negative pulse thereacross.

The resistor 137 forms a common emitter circuit resistor for the first stage 36a of the frequency divider circuit 36. The first stage 36a is a transistor bistable circuit substantially identical to the bistable circuit 20, and thus a description of its operation will not be given. Suffice it to say, each time a negative pulse appears across the common emitter resistor 137, the bistable circuit will be switched to a different state. The output of the first stage of the frequency divider is taken at the output terminal 140 and will comprise a single cycle of a square wave for each pair of negative pulses fed to the resistor 137. The square wave is fed to a differentiating network comprising a capacitor 144 in series with a resistor 145. The resulting sharp negative and positive pulses appearing across the resistor 145 are fed to a rectifier 146 which blocks the positive pulses and feeds the negative pulses to the common emitter resistor 148 of the second stage 36b of the frequency divider. This stage comprises a transistor bistable circuit which is also substantially identical to the bistable circuit 20 previously described. Suffice it to say, for each negative pulse fed to the resistor 148, the state of the bistable stage 36b will be reversed. There will thus appear at the output terminal 149 of the second stage 36b of the frequency divider a square wave which has a period twice as long as the period of the square wave output of the first stage 36a since it requires the two negative pulses derived from two cycles of the output of the first stage 36a to complete a cycle thereof. The square wave output at the output terminal 149 of the second stage 36b is fed to the aforementioned differentiating network comprising the capacitor 40 and the resistor 42 which provide positive and negative pulses across the resistor 42 for each cycle of the square wave fed thereto. These pulses may be fed through a rectifier 151 which blocks the positive pulses to the input 44 of the bistable circuit 20.

As previously explained in connection with the description of the operation of FIG. 1 and the waveforms shown in FIGS. 2(a) through 2(j), there will appear at the output terminal 22 of the bistable circuit 20 a square wave having a negative going portion having a duration depending upon the relative phase of the beat indicating pulse last fed to the bistable circuit and the next reference frequency pulse. Depending upon the condition of the watch movement, the voltage waveform at the output terminal 22 will resemble the waveforms shown in FIGS. 2(d), 2(g) or 2(j) but of inverse polarity to that shown therein.

The square wave output of the bistable circuit 20 is fed to one end of a resistor 152 whose other end is connected to the base electrode 156b of a PNP transistor 156 forming part of the electronic switch 24. A resistor 153 is connected between the base electrode 156b and the ground line 53'. The collector electrode 156a of transistor 156 is connected to the negative line 66' by a conductor 160. The emitter electrode 156c of the transistor is connected by a resistor 162 to a normally closed jack 164 into which an auxiliary measuring device may be plugged which opens the closed contacts 164a thereof. The jack 164 is connected to the meter 28 which, in turn, is connected to the juncture between resistors 166 and 168 whose unconnected ends are respectively connected to the negative line 66' and the ground line 53'.

The emitter electrode 156c of the transistor 156 is also connected to a branch circuit including a switch 170 in series with a capacitor 172 connected to the ground line 53'. Normally the switch 170 is closed so that the capacitor is effectively connected in parallel with the meter circuit to stabilize or average out the current flow therethrough. Although the movement of the meter pointer 28' is heavily damped, in the absence of the capacitor 172 it is still able to respond to the varying durations of successive current pulsations fed thereto by registering a deflection proportional to the duration of each pulsation. This assumes that the time constant of the meter movement is such that the pointer will not reach the maximum deflection point for a current pulsation of maximum width. This enables the meter to indicate the non-symmetrical oscillation of the balance staff at its opposite extremes of movement, for such a situation will produce beat indicating pulses of different phase.

In the reset state of the bistable circuit 20, the transistor 104 will be highly conductive and the bias conditions on the base electrode 156b resulting therefrom will cause the transistor 156 to be in a relatively nonconductive state. When the bistable circuit 20 is triggered into its opposite state, the resulting non-conduction of the transistor 104 will result in a highly negative voltage on the base electrode 156b which causes the transistor 156 to conduct heavily until the bistable circuit is reset in the manner explained.

When the switch 170 is closed to connect the capacitor 172 into the circuit, the meter circuit becomes electrically damped to a point where it cannot indicate the difference of the durations of two successive current pulsations fed thereto. In effect, the capacitor averages out the current waveform.

In the circuit diagram of FIG. 3, the D.C. source 28 described in FIG. 1 is a part of the power supply 34 which will now be described. The power supply 34 utilizes the aforementioned secondary winding 127c of the transformer 127. One end of this winding is connected to the ground line 129 and the other end thereof is connected through a resistor 173 to a rectifier 175 which passes only the negative portion of the A.C. waveform fed thereto from the transformer 127. The output side of the rectifier 175 is connected to a filter circuit 177 including a resistor 179 extending to the power supply line 66 and a pair of filter capacitors 181 and 183 which filter out voltage fluctuations in the D.C. output of the power supply.

To summarize the operation of the invention, when the switches 125 and 170 are closed and a watch 2 is held adjacent the microphone 4, an accurate beat frequency of the watch movement will be indicated by a substantially constant (although slightly vibrating) deflection of the meter pointer 28'. An imperfect beat frequency of the watch movement will be indicated by a progressively varying deflection of the pointer 28' over the face of the meter. Upon opening of the switch 170, a non-symmetrical beat of the watch movement can be indicated by the variation of the maximum deflection of the pointer 28' for successive vibrations of the pointer.

The present invention has thus provided a very convenient and easy to use, reliable and accurate means for testing the beat frequency of a watch movement and the symmetry of the watch beats, without the need for a standard watch movement and mechanical connections to the watch movement.

It should be understood that numerous modifications may be made of the preferred form of the invention above described without deviating from the broader aspects of the invention.

What I claim as new and desire to protect by Letters Patent of the United States is:

1. Watch testing apparatus for comparing the beat frequency of a watch movement with that of a reference frequency: said apparatus comprising: a microphone and an amplifier coupled thereto for detecting the beat of a watch movement and providing amplified beat indicating control signals corresponding to the beats of the watch movement under test, means providing a source of reference control signals at a fixed predetermined frequency, the ratio of the frequency of one of the reference control signals and the correct beat frequency of the watch movement to the other of same being a whole number greater than one, an electrical measuring device responsive to the amplitude of an electrical signal coupled thereto, a source of electrical energy for said device, switch means for coupling and uncoupling said source from said device, and switch operating bistable control means having respective states triggered respectively by said beat indicating and reference control signals, and, in one of said states, operating said switch means to initiate the coupling of said source of electrical energy to said measuring device, and, in the other of said states, operating said switch means to decouple said source of electrical energy from said measuring device, a constant indication of said measuring device indicating a correct beat rate of the watch movement under test and a fluctuating indication of said measuring device indicating an imperfect beat rate of the watch movement.

2. Watch testing apparatus for comparing the beat frequency of a watch movement with that of a reference frequency: said apparatus comprising: a microphone and an amplifier coupled thereto for detecting the beat of a watch movement and providing amplified beat indicating control signals corresponding to the beats of the watch movement under test, means providing a source of reference control signals at a fixed predetermined frequency, the ratio of the frequency of one of the reference control signals and the correct beat frequency of the watch movement to the other of same being a whole number, an electrical measuring device responsive to the amplitude of an electrical signal coupled thereto, a source of electrical energy for said device, switch means for coupling and uncoupling said source from said device, means for averaging the electrical energy pulsations applied to said device, means for selectively connecting and disconnecting said averaging means selectively to cause said device to respond to the average and instantaneous magnitudes of the electrical energy pulsations fed thereto, and switch operating means responsive to the beat indicating and reference control signals for operating said switch means to initiate the coupling of said source of electrical energy to said measuring device each time one of the control signals occur, and operating said switch means to decouple said source of electrical energy from said measuring device each time the other control signal occurs, a constant indication of said measuring device indicating a correct beat rate of said watch movement and a fluctuating indication of said measuring device indicating an imperfect beat rate of said watch movement.

3. Watch testing apparatus for comparing the beat frequency of a watch movement with that of a reference frequency: said apparatus comprising: a microphone and an amplifier coupled thereto for detecting the beat of a watch movement and providing amplified beat indicating control signals corresponding to the beats of the watch movement under test, said beat indicating signals comprising a series of spaced signal units each comprising a series of contiguous pulsations representing the vibrations of one beat of the watch movement, means responsive to the first of the pulsations in each of said signal units for generating a square pulse of greater duration than the longest expected signal unit, differentiating means for differentiating said square pulse and providing a single narrow beat indicating control pulse coinciding with the leading edge of each square pulse, means providing a source of reference control pulses at a fixed predetermined pulse repetition rate, the ratio of the frequency of one of the reference control pulses and the desired beat frequency of the watch movement to the other of same being a whole number, an electrical measuring device responsive to the amplitude of the electrical signal coupled thereto, a source of electrical energy for said device, switch means for coupling and uncoupling said source of electrical energy to and from said measuring device, and switch operating means for operating said switch means to couple said source of electrical energy to said measuring device each time one of said beat indicating and reference control pulses occur, and for operating said switch means to decouple said source of electrical signals from said measuring device each time the other control pulses occur, a constant indication of said measuring device indicating a correct beat rate of said watch movement and a fluctuating indication of said measuring device indicating an imperfect beat rate of said watch movement.

4. Watch testing apparatus for comparing the beat frequency of a watch movement to that of a reference frequency: said apparatus comprising a microphone and an amplifier coupled thereto for detecting the beat of a watch movement and providing amplified electrical signals corresponding to the beats of the watch movement under test, the electrical signals comprising a series of spaced signal units each comprising a series of contiguous pulsations representing the vibrations of one beat of the watch movement, monostable multivibrator means responsive to the first of the pulsations in each of said signal units for providing a single narrow beat indicating control pulse coinciding with the start of each signal unit and having a greater duration than the longest expected signal unit, means providing a source of reference control pulses at a fixed predetermined pulse repetition rate, the ratio of the higher of the frequency of the reference control pulses and the desired beat rate of the watch movement to the other of same being a whole number, a D.C. meter movement having a pointer indicating the current flow through the meter movement, a source of D.C. energizing current for said meter movement, electronic switch means for coupling and uncoupling said source of D.C. current from said meter movement, and switch operating bistable control means responsive to said control pulses for operating said switch means to initiate the coupling of said source of D.C. current to said meter movement each time one of said beat indicating and reference control pulses occur, and operating said switch means to decouple said source of current from said meter movement each time the other control pulses occur, a consistent deflection of said pointer indicating a correct beat rate of said watch movement and a fluctuating deflection of said pointer indicating an imperfect beat rate of said watch movement.

References Cited by the Examiner

UNITED STATES PATENTS

| | | | |
|---|---|---|---|
| 2,541,286 | 2/51 | Renaud | 73—6 |
| 2,774,872 | 12/56 | Howson | 331—27 |
| 2,784,586 | 3/57 | Campbell et al. | 73—6 |
| 2,903,881 | 9/59 | Frolow | 73—6 |
| 2,931,217 | 4/60 | Wendt et al. | 73—6 |

ISAAC LISANN, *Primary Examiner.*